United States Patent [19]

Tims

[11] 3,903,505
[45] Sept. 2, 1975

[54] METHOD FOR OBTAINING CALIBRATION DATA

[75] Inventor: Harold A. Tims, Bartlesville, Okla.

[73] Assignee: Phillips Petroleum Company, Bartlesville, Okla.

[22] Filed: Jan. 29, 1973

[21] Appl. No.: 327,732

[52] U.S. Cl. .................. 340/15.5 MC; 340/15.5 CC
[51] Int. Cl. ............................................. G01v 1/00
[58] Field of Search ....... 340/15.5 GC, 15.5 MC, 17

[56] References Cited
UNITED STATES PATENTS

| | | | |
|---|---|---|---|
| 2,087,702 | 7/1937 | Peters | 340/15.5 MC |
| 2,265,538 | 12/1941 | Minton | 340/15.5 GC |
| 3,406,781 | 10/1968 | Willner | 340/17 |

OTHER PUBLICATIONS

A.P.C. Application of Maillet, Serial No. 254,743 Published 5-18-43.

Primary Examiner—Maynard R. Wilbur
Assistant Examiner—T. M. Blum

[57] ABSTRACT

A method for obtaining data for calibrating a recording system in situ. The recording system has a plurality of channels, each having a sensing element, a transmitting element, and a recording element. In the method, the sensing and transmitting elements are installed in a preselected position, the sensing elements are controllably excited, a signal representative of the magnitude of excitation relative to time is delivered from each sensing element, separately received, corrected in response to the sensitivity of its respective channel, composited one with the other to form a composite signal, and a systems calibration's operator is computed for each of the channels from the composite signal.

9 Claims, 1 Drawing Figure

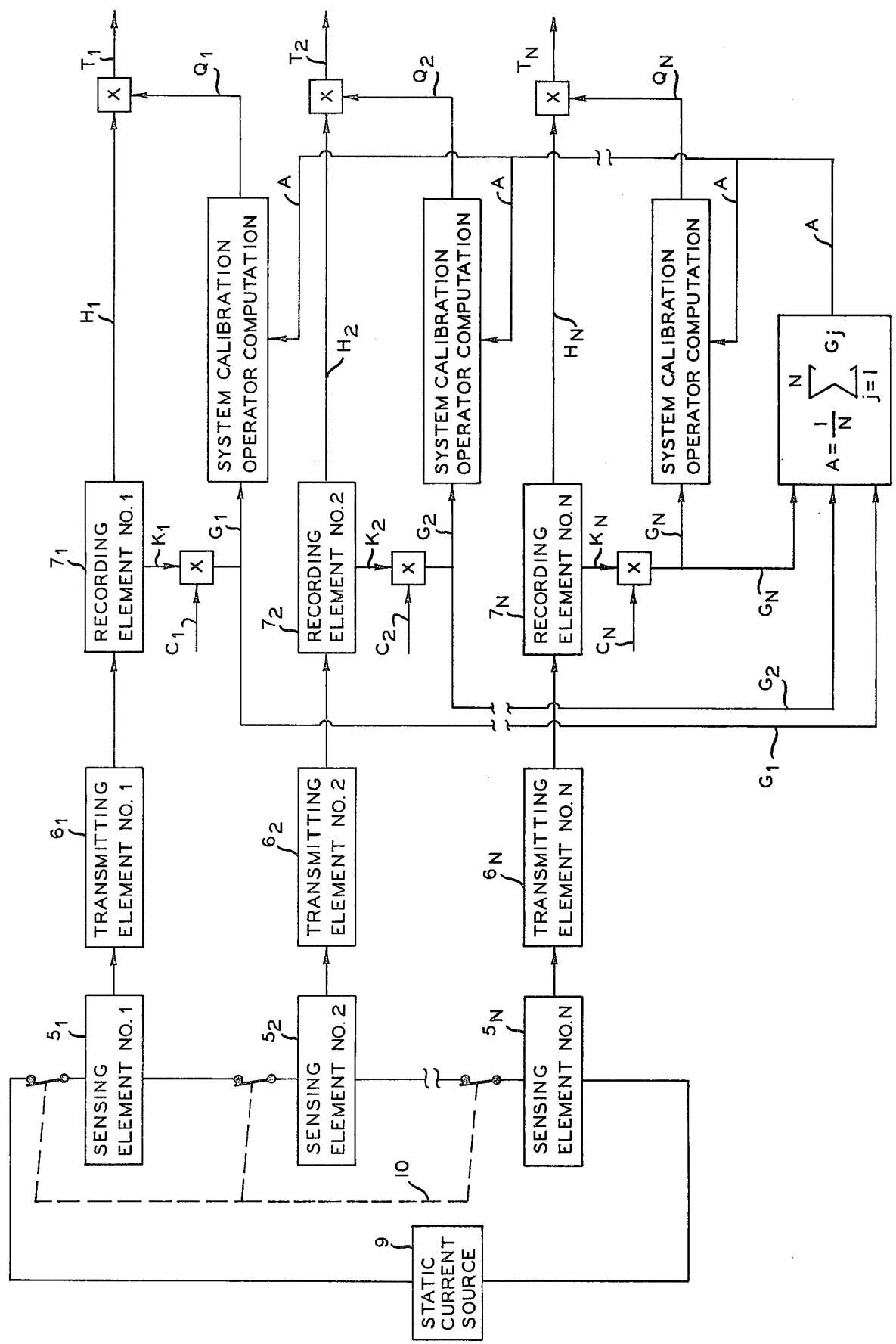

METHOD FOR OBTAINING CALIBRATION DATA

In recording systems having a plurality of channels each having a sensing element, a transmitting element, and a recording element, the sensitivity of each channel sometimes varies. This variation in channel sensitivity can be caused by several factors such as differences in sensing elements and construction, differences in cable length between the sensing element and the recording element, differences in cable construction, atmospheric conditions, differences in ages of the equipment among others, for example.

It is therefore desirable to provide a method for obtaining data for calibrating a recording system in situ for subsequent calibrating the system and thereby obtaining recordings of improved accuracy. An example use of the method of this invention would be for obtaining data for calibrating a seismic recording system utilized in the oil industry.

This invention, therefore, resides in a method for obtaining data for calibrating a recording system in situ. The recording system has a plurality of channels, each having a sensing element, a transmitting element, and a recording element. In the method, the sensing elements and transmitting elements are installed in a preselected position, the sensing elements are controllably excited, a signal representative of the magnitude of excitation relative to time is delivered from each sensing element, separately received, corrected in response to the sensitivity of its respective sensing elements, composited one with the other to form a composite signal and a systems calibration operator is computed for each of the channels from the composite signal.

The method of this invention will be described with reference to a seismic recording system such as utilized in the oil industry. It should be understood, however, that the method can be used with other recording systems.

The method of this invention, sensing elements, for example, geophones, and transmitting elements including the cable to each geophone are installed in a preselected position. This position is preferably the array of the geophones which will subsequently be utilized for a recording of the subsequent formations at this location. These preselected positions are many and varied and are known in the art.

With the sensing and transmitting elements selectively positioned, each of the sensing elements is controllably excited, and a signal representative of the magnitude of excitation relative to time is delivered to and separately received by the recording element.

Where the sensing elements are geophones having a suspended mass, for example, the geophones can be controllably excited, for example by substantially simultaneously biasing the suspended mass of each of the geophones for a preselected period of time and thereafter substantially, simultaneously, releasing each mass. In geophones of this construction, the mass can be biased by passing a static current to each geophone. Release of the suspended mass can be accomplished by terminating the current passing through each geophone. The release of the suspended mass will thereby cause the sensing element to be controllably excited and the signal to be delivered as described above.

In the drawing, the sole FIGURE is a schematic representation of a system utilizing the method of the invention.

Referring to the FIGURE in detail, there is illustrated a system having a plurality of channels each having a sensing element $5_1, 5_2, ... 5_N$, a transmitting element $6_1, 6_2, ... 6_N$, and a recording element $7_1, 7_2, ... 7_N$. A means for controllably exciting each sensing element $5_1, 5_2, ... 5_N$ comprises a static current source 9 and means 10 for terminating the current passing through each sensing element.

Each received signal ($K_j$) is thereafter corrected by multiplying each separate signal ($K_j$) by a constant ($c_j$) which is representative of the sensitivity of the sensing element producing the respective signals for obtaining a corrected signal ($G_j$) for each channel.

Each of the corrected signals ($G_j$) are thereafter composited to form a composite signal. The corrected signals can be composited with respect to time or with respect to frequency.

The corrected signals ($G_j$) can be composited with respect to time by the equation:

$$A(t) = \frac{1}{N} \sum_{j=1}^{N} G_j(t)$$

where:

$A(t)$ = the composite signal in the time domain;
$N$ = the total number of channels;
$j$ = a channel number;
$G_j(t)$ = corrected signal in time domain.
$\Sigma$ = summation sign.

The corrected signals ($G_j$) can be composited with respect to frequency by the equation:

$$A(f) = \frac{1}{N} \sum_{j=1}^{N} G_j(f)$$

where:

$A(f)$ = the composite signal in the frequency domain;
$N$ = total number of channels;
$j$ = a channel number;
$G_j(f)$ = corrected signal in frequency domain.

A systems calibration operator is thereafter computed for each of the respective channels. Where the corrected signals are composited with respect to time, the systems calibrations operator for each of the channels can be computed with respect to time by the equation:

$$Q_j(t) = A(t) * G_j^{-1}(t)$$

$Q_j(t)$ = the system calibration operator in the time domain;
$*$ = convolution;
$G_j^{-1}(t)$ = inverse of $G_j(t)$; when $G_j(t) * G_j^{-1}(t) = \delta(t)$, a delta function.

Where the corrected signals are composited with respect to frequency, the systems calibrations operator for each of the channels can be computed with respect to frequency by the equation:

$$Q_j(f) = \frac{A(f)}{G_j(f)}$$

$Q_j(f)$ = the system calibration operator in the frequency domain.

Having obtained a systems calibrations operator for each of the channels, any recording at that preselected positioning of the sensing and transmitting elements can be calibrated and a recording having improved accuracy for each channel can be obtained.

Example equations for calibrating a systems signal response are:

$T_j(t) = H_j(t) * Q_j(t)$ in the time domain or $T_j(f) = [H_j(f)][Q_j(f)]$ in the frequency domain where:

$T_j(t)$ = calibrated systems response in the time domain;

$T_j(f)$ = calibrated systems response in the frequency domain;

$H_j(t)$ = a systems response represented in the time domain;

$H_j(f)$ = a systems response represented in the frequency domain;

$Q_j(t)$ = the systems calibration operator in the time domain;

$Q_j(f)$ = the systems calibration operator in the frequency domain;

* = convolution j = channel number.

By the use of this method, calibration data can be obtained for a recording system in situ. This data can thereafter be applied to recordings obtained at the preselected position for calibrating the recordings, thereby improving the accuracy of the recordings.

What is claimed is:

1. A method for obtaining data for calibrating a recording system in situ, said recording system having a plurality of channels, each having a sensing element, a transmitting element, and a recording element, comprising:
   installing the sensing elements and transmitting elements in preselected positions;
   controllably exciting each of the sensing elements;
   delivering from each sensing element a signal representative of the magnitude of controlled excitation relative to time;
   separately receiving and each recording signal;
   correcting each said signal in response to the sensitivity of its respective sensing elements;
   computing a systems calibration operator for each of the channels.

2. A method, as set forth in claim 1, wherein the sensing elements are geophones, each having a suspended mass, and including
   biasing the suspended mass of each of the geophones for a preselected period of time; and
   substantially, simultaneously releasing each mass thereby controllably exciting each geophone.

3. A method, as set forth in claim 2, wherein each mass is biased by passing a static current to each geophone and each mass is released by terminating the current passing to each geophone.

4. A method as set forth in claim 1 additionally comprising compositing each corrected signal for forming a composite signal.

5. A method, as set forth in claim 4, wherein each corrected signal is composited in respect to time by the equation $$A(t) = \frac{1}{N} \sum_{j=1}^{N} G_j(t)$$

where:

$A(t)$ = the composite signal in the time domain;

$N$ = the total number of channels;

$j$ = a channel number;

$G_j(t)$ = corrected signal in time domain.

6. A method as set forth in claim 5, wherein the systems calibration operator for each of the channels is computed with respect to time by the equation $$Q_j(t) = A(t) * G_j^{-1}(t)$$

where:

$Q_j(t)$ = the system calibration operator in the time domain;

* = convolution.

7. A method, as set forth in claim 4, wherein each corrected signal is composited with respect to frequency by the equation $$A_{(f)} = \frac{1}{N} \sum_{j=1}^{N} G_j(f)$$

where:

$A(f)$ = the composite signal in the frequency domain;

$N$ = total number of channels;

$j$ = a channel number;

$G_j(f)$ = corrected signal in frequency domain.

8. A method, as set forth in claim 7, wherein the systems calibration operator for each of the channels is computed with respect to frequency by the equation $$Q_j(f) = \frac{A_{(f)}}{G_j(f)}$$

where:

$Q_j(f)$ = the system calibration operator in the frequency domain.

9. A method for improving the accuracy of recordings utilizing a recording system having a plurality of channels, each having a sensing element, a transmitting element, and a recording element, comprising:
   installing the sensing elements and transmitting elements in preselected positions;
   controllably exciting each of the sensing elements;
   delivering from each sensing element a signal representative of the magnitude of controlled excitation relative to time;
   separately receiving and recording each said signal;
   determining from the said signals thus received a systems calibration operator for each of the channels; and
   applying said systems calibration operator to a systems response to obtain a calibrated systems response.

* * * * *

UNITED STATES PATENT AND TRADEMARK OFFICE
CERTIFICATE OF CORRECTION

PATENT NO. : 3,903,505
DATED : September 2, 1975
INVENTOR(S) : Harold A. Tims

It is certified that error appears in the above-identified patent and that said Letters Patent are hereby corrected as shown below:

Column 3, claim 1, line 43, "each recording signal" should read --- recording each said signal; line 45, after "elements;" insert --- and ---.

Signed and Sealed this

Twenty-sixth Day of April 1977

[SEAL]

Attest:

RUTH C. MASON
*Attesting Officer*

C. MARSHALL DANN
*Commissioner of Patents and Trademarks*